Patented July 11, 1944

2,353,192

UNITED STATES PATENT OFFICE 2,353,192

STABILIZED FUEL OIL COMPOSITION AND METHOD THEREOF

Edmund L. Sargent and Edward A. Oberright, Woodbury, N. J., assignors to Socony-Vacuum Oil Company, Incorporated, New York, N. Y., a corporation of New York No Drawing. Application January 21, 1942, Serial No. 427,592

13 Claims. (Cl. 44—62)

This invention has to do with the stabilization of mineral oil fractions against the harmful effects of oxidation or deterioration during storage or use. More specifically this invention is concerned with the improvement or stabilization of mineral oil fractions by the use of novel reaction products, or a novel class of reaction products, which when incorporated in such an oil fraction in minor proportions will prevent or delay undesirable changes taking place in the oil fraction.

The present invention is concerned in general with the stabilization of mineral oil fractions, and more particularly with the stabilization of distillate fuel oil fractions derived from mineral oil. Distillate fuel oils such as those grades known to the industry as #2 and #3 grades are usually derived from cracking operations, and are used for domestic heating, light duty heating, etc. In storage, such fuel oils tend to deteriorate in color and form sediment, insoluble gum, etc., which if not removed plug filter screens, orifices, and other parts of the equipment used in burning these oils. And even when, after some storage, all visible sediment is removed from such fuels, other sediment continues to form.

The formation of sediment, insoluble gum, etc., in, and deterioration in color of, distillate fuel oils is attributed to the oxidation of unstable constituents therein. A secondary factor contributing to the deterioration of such oils is heat, for it has been found that the higher the storage temperature, the more rapid is the deterioration.

Various chemical and physical means have been resorted to in order to remedy the unstable nature of distillate fuel oils. Treatment of these oils with sulphuric acid is frequently used; however, such refining is quite expensive and the degree of improvement is not always satisfactory. Acid treating followed by redistillation improves distillate fuel oil stability providing a considerable quantity of acid is used; here again, treating costs are excessive. Centrifuging has been successfully used as a temporary expedient for removing visible sediment in aged fuel oils, but this method does not prevent the formation of additional amounts of sediment in continued storage.

Thus, one object of the present invention is to provide a distillate fuel oil composition stabilized against the deleterious effects of oxidation during storage and during the conditions of use generally encountered. It is a further object of the present invention to provide a method for stabilizing distillate fuel oils against deterioration as described above.

The invention is predicated on the discovery that certain new and novel metal organic reaction products effectively retard or prevent the deteriorating effects of oxidation on distillate fuel oils. We have found that the condensation products of an aliphatic aldehyde, an aliphatic polyamine in which each amino group is characterized by the presence of at least one hydrogen atom, and an alkyl substituted hydroxy aromatic compound, when further reacted to replace the hydroxyl hydrogen of the condensation product with metal yield surprisingly effective oxidation inhibitors. Preferred reaction products are those obtained by condensing about one mol equivalent of an aliphatic aldehyde with at least one-half mol equivalent of an aliphatic polyamine in which each amino group is characterized by the presence of at least one hydrogen atom, and with a sufficiency of an alkyl substituted hydroxy aromatic compound such that the content of the hydroxy aromatic radical is about one mol equivalent; and subsequently reacting the condensation product with an alcohol solution of an alkaline earth metal oxide or alkaline earth metal hydroxide, containing an equivalent of alkaline earth metal to replace the hydroxyl hydrogen of the alkyl substituted hydroxy aromatic compound.

Aldehydes contemplated by the present invention are the aliphatic aldehydes, representative of which are formaldehyde, acetaldehyde, and aromatic aldehydes, representative of which is benzaldehyde. Preference is given herein to formaldehyde.

The aliphatic polyamines contemplated herein are those in which each amino group is characterized by the presence of at least one hydrogen atom. Such aliphatic polyamines may contain only primary amino groups, only secondary amino groups, or both primary and secondary amino groups. Of this class of amines preference is given to the diamines in which two primary amino groups are attached to adjacent carbon atoms, and particular preference is given to ethylene diamine. Typical polyamines of the class described by the foregoing are ethylene diamine, propylene diamine and other members of this homologous series.

Representative hydroxy aromatic compounds contemplated by this invention are phenol, resorcinol, hydroquinone, catechol, cresol, xylenol, hydroxydiphenyl, benzylphenol, phenyl-ethyl-phenol, phenol resins, methyl-hydroxydiphenyl, guiacol, alpha and beta naphthol, alpha and beta methyl naphthol, tolyl naphthol, xylyl naphthol, benzylnaphthol, anthranol, phenyl-methyl naphthol, phenanthrol, monomethyl ether of catechol, methoxyphenol, phenoxyphenol, anisole, beta naphthyl methyl ether, chlorphenol and the like. Preference in general is to the monohydroxy phenols otherwise unsubstituted, particular preference being given to phenol and alpha and beta naphthol.

As described above, the hydroxyl hydrogen of the alkyl substituted hydroxy aromatic group in the intermediate condensation product is replaced with its equivalent of metal. Preference is given to metals of the alkaline earth group, particularly to barium. The metal is made available by reaction of its oxide, or hydroxide, in alcohol solution with the hereinbefore described intermediate condensation product. Alcohols suitable for this purpose are methanol, ethanol, etc. Broadly, the alkyl groups contemplated herein as substituents on the hydroxy aromatic compound are alkyl groups which will impart oil solubility to the final product. Preferably, such alkyl substituents are long chain, relatively high molecular weight hydrocarbon groups having at least 20 carbon atoms. Particularly well adapted for the purposes herein described are alkyl groups derived from petroleum wax, which is a predominantly straight chain aliphatic hydrocarbon of at least 20 carbon atoms. It will be obvious to those skilled in the art that the maximum number of oil-solubilizing alkyl groups is limited by the number of valences on the aromatic nucleus available for substitution. Naturally, the maximum number of such groups which can be attached to a single aromatic nucleus will vary as the nucleus is mono- or poly-cyclic and as the nucleus is otherwise substituted.

The present invention has been purposely directed to recite reaction products of the aforesaid preferred reactants for, as yet, the theory of reaction is not fully understood. Some evidence is available, as, for example, quantitative analysis of the reaction product, to point to the presence of a major quantity of one compound. As an illustration, when typical reactants as a wax-substituted phenol, formaldehyde, ethylene diamine, and barium oxide in alcohol solution, are reacted as hereinafter described, analysis indicates that the predominant product is

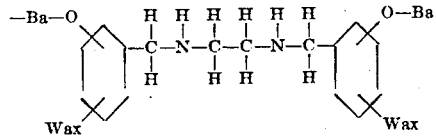

Probably present also in the reaction product is a compound of the following type:

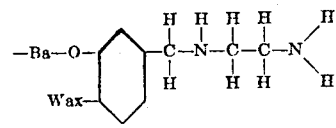

The foregoing is for illustrative purposes only and is not to be construed as limiting the present invention to a theory of reaction, for the present invention is directed primarily to reaction products obtained by interreaction of the reactants described herein as improving agents for distillate fuel oils and the like.

As aforesaid the general procedure for preparing the reaction products contemplated herein involves the interreaction of an alkyl substituted hydroxy aromatic compound, an aliphatic aldehyde and an aliphatic polyamine, wherein the amino groups have at least one free hydrogen, and subsequent reaction or treatment of the product thus obtained to replace or substitute the hydroxyl hydrogen with metal. A typical and preferred alkyl substituted hydroxy aromatic compound which may be used is a wax-substituted phenol or "wax phenol." The term "wax" as used herein has reference to petroleum wax or aliphatic hydrocarbons, or hydrocarbon groups of the type which characterize petroleum wax. These so-called "wax" substituents may be obtained by alkylation of the phenol or hydroxy aromatic hydrocarbon with a relatively high molecular weight aliphatic hydrocarbon or mixture of such hydrocarbons, like petroleum wax, by any suitable alkylation procedure. For example, one preferred procedure for obtaining a "wax phenol" is by a Friedel-Crafts condensation of chlorinated petroleum wax with phenol.

Further details of a preferred procedure for making the reaction products of this invention where the aforesaid wax phenol is employed as the alkyl substituted hydroxy aromatic compound, may be obtained from the following example:

EXAMPLE 1

The reaction product of formaldehyde, ethylene-diamine, wax phenol and barium oxide was prepared as follows:

(a) Alkylation of phenol

A paraffin wax melting at approximately 120° F. and predominantly comprised of compounds having at least 20 carbon atoms in their molecules is melted and heated to about 200° F., after which chlorine is bubbled therethrough until the wax has adsorbed about 16% of chlorine, such product having an average composition between a monochlor wax and a dichlor wax. Preferably the chlorination is continued until about one-sixth the weight of the "chlorwax" formed is chlorine. A quantity of chlorwax thus obtained, containing 3 atomic proportions of chlorine, is heated to a temperature varying from just above its melting point to not over 150° F., and one mol of phenol (C6H5OH) is admixed therewith. The mixture is heated to about 150° F., and a quantity of anhydrous aluminum chloride corresponding to about 3% of the weight of chlorwax in the mixture is slowly added to the mixture with active stirring. The rate of addition of the aluminum chloride should be sufficiently slow to avoid violent foaming, and during such addition the temperature should be held at about 150° F. After the aluminum chloride has been added, the temperature of the mixture may be increased slowly over a period of from 15 to 25 minutes to a temperature of about 250° F. and then should be more slowly increased to about 350° F. To control the evolution of HCl gas the temperature of the mixture is preferably raised from 250° F. to 350° F. at a rate of approximately 1° per minute, the whole heating operation occupying approximately two hours from the time of adding the aluminum chloride. If the emission of HCl gas has not ceased when the final temperature is reached the mixture may be held at 350° F. for a short time to allow completion of the reaction. But, to avoid possible cracking of the wax, the mixture should not be heated appreciably above 350° F., nor should it be held at that temperature for any extended length of time.

It is important that all unreacted or non-alkylated hydroxyaromatic material (phenol) remaining after the alkylation reaction be removed. Such removal can be effected generally by water-washing, but it is preferable to treat the water-washed product with super-heated steam, thereby insuring complete removal of the unreacted material and accomplishing the dry-out of the product in the same operation.

A wax-substituted phenol prepared according to the above procedure, in which a quantity of chlorwax containing 3 atomic proportions of chlorine (16% chlorine in the chlorwax) is reacted with one mol of phenol, may, for brevity herein, be designated as "wax-phenol (3-16)."

(b) Formation of intermediate diamine product

One hundred grams of wax phenol (3-16) prepared according to the foregoing procedure are dissolved in butyl alcohol and 12.5 grams of a 70% solution of ethylene diamine in water are added thereto. To this solution 11.8 grams of a 37% solution of formaldehyde in water are added dropwise at room temperature and with stirring. Butyl alcohol and benzol are added as needed to give a clear reaction mixture which is stirred for 3 hours at room temperature, and then heated at reflux for several hours. The product is water-washed and the solvents are removed by distillation which also removes any entrained water, to give the aliphatic diamino substituted wax phenol reaction product.

(c) Metal organic reaction product

The substitution of a metal (barium) for the hydroxyl hydrogen in the intermediate reaction product obtained by the procedure described in paragraph b was effected by blending 100 grams of such reaction product in 200 grams of a distillate fuel oil, heating the blend to 75° C. and adding dropwise, at this temperature, 10 grams of barium oxide dissolved in methanol. The released methanol is allowed to distill. The temperature is then raised to 125° C. for 30 minutes to remove traces of methanol, and the mixture is filtered with a suitable filter aid such as HiFlo to give the finished reaction product which is approximately a one-third blend in fuel oil.

The effectiveness of reaction products contemplated herein was demonstrated by storage tests conducted on a distillate fuel oil having the properties enumerated below in Table I and on the same fuel oil containing the typical reaction product prepared in the foregoing example. Samples of the oil and oil blends were stored in one quart glass containers with an iron strip and allowed to stand for extended periods of time at temperatures of 75° F. and 150° F. The time for the appearance of sediment together with the amount of sediment and gum formed and the degradation in color were observed over varying intervals of time. The results of such tests are tabulated in Table II.

TABLE I

*Cracked Mid-Continent No. 2 fuel oil*

| | |
|---|---|
| Gravity_____° A. P. I__ | 33.5 |
| Color, N. P. A_____ | 3— |
| Flash point_____° F__ | 194 |
| Pour point_____° F__ | —15 |
| Sulphur_____percent by weight__ | 0.2 |

*Distillation, A. S. T. M., ° F.*

| | |
|---|---|
| I. B. P_____ | 416 |
| 5%_____ | 441 |
| 10_____ | 450 |
| 50_____ | 492 |
| 90_____ | 569 |
| E. P_____ | 627 |
| Recovery_____ | 99.0 |
| Residue_____ | 1.0 |
| Loss_____ | ____ |
| Carbon residue, on 10% distillation residue___ | 0.1 |
| Accelerated aging deposits, mgs./100 c. c. (4 hrs. at 275° F., 100 lbs./sq. in. oxygen pressure)_____ | 25.1 |

TABLE II

| Properties | Concentration of reaction product prepared in Example I—a, b, c | |
|---|---|---|
| | None | 0.10 |
| Time for appearance of sediment, days: | | |
|   75° F. storage | 6 | 50 |
|   150° F. storage | 2 | 46 |
| Sediment by centrifuging: | | |
|   After 30 days at 75° F. storage | Trace | Trace |
|   After 70 days at 75° F. storage | 0.03 | Trace |
|   After 100 days at 75° F. storage | 0.05 | Trace |
|   After 30 days at 150° F. storage | 0.04 | Trace |
|   After 70 days at 150° F. storage | 0.09 | Trace |
|   After 100 days at 150° F. storage | 0.18 | 0.01 |
| Gum deposited on interior of storage container | (1) | None |
| Color, N. P. A.: | | |
|   Start | 2½— | 2½— |
|   After 30 days at 75° F. storage | 4½— | 4— |
|   After 70 days at 75° F. storage | 5 | 4— |
|   After 100 days at 75° F. storage | 6— | 4½ |
|   After 30 days at 150° F. storage | 5 | 4½ |
|   After 70 days at 150° F. storage | 5— | 5— |
|   After 100 days at 150° F. storage | 5 | 5— |

[1] Indeterminate amount.

To further demonstrate the effectiveness of the reaction products contemplated by the present invention, the same oil described in Table I, alone and blended with the typical reaction product, was subjected to an accelerated aging test. In this test, sediment and insoluble gum are measured after the oil samples are aged for 4 hours at 275° F. under 100 lbs./sq. in. oxygen pressure. Results of this test are tabulated below in Table III.

TABLE III

| Inhibitor concentration, per cent weight | Mid-Continent crude source, accelerated aging sediment and gum, mgs./100 c. c. |
|---|---|
| None | 25.1 |
| 0.0010 | 19.5 |
| 0.0025 | 7.8 |
| 0.0100 | 0.5 |
| 0.0250 | 0.3 |
| 0.1000 | 0.3 |
| 0.2500 | 0.2 |

It can be readily observed from the results given in the foregoing tables that reaction products of the novel class contemplated herein, as typified by the illustrative reaction product prepared and tested herein, are effective to stabilize distillate fuel oils against the deleterious effects of oxidation under the conditions of storage and use usually encountered. The improved properties obtained and the degree of improvement effected may be varied with the aldehyde, metal, polyamine, and aromatic constituents in the reaction products, and also by the degree of alkylation of the hydroxy aromatic nucleus. As to the degree of alkylation, it is important that the hydroxy aromatic nucleus be sufficiently alkylated to provide a final reaction product "soluble" or "miscible" in the particular distillate fuel oil fraction with which it is to be blended; that is, one which will remain uniformly dispersed in the oil in sufficient amount to effect the desired improvement. The amount of improving agent used may be varied, depending upon the mineral oil or distillate fuel oil fraction with which it is blended and the properties desired in the final oil composition. The reaction products described herein may be used in amounts ranging from about 0.001% to about 2%, but it appears that amounts ranging from about 0.001% to about 0.250% by weight will give compositions of the desired improved properties.

It is to be understood that while we have described certain preferred procedures which may be followed in the preparation of the novel reaction products contemplated herein as stabilizing agents and have referred to representative reactants for use in their preparation, such procedures and reactants have been used for illustrative purposes only. The invention, therefore, is not to be considered as limited by the specific examples given but includes within its scope such changes and modifications as fairly come within the spirit of the appended claims.

We claim:

1. An improved distillate fuel oil composition comprising a distillate fuel oil having admixed therewith a minor proportion of a reaction product obtained by first interreacting an aliphatic aldehyde, an aliphatic polyamine, in which each amino group has at least one hydrogen atom, and an alkyl-substituted hydroxy aromatic compound, and then substituting the hydroxyl hydrogen in the condensation product thus obtained with metal.

2. An improved distillate fuel oil composition comprising a distillate fuel oil having admixed therewith a minor proportion of a reaction product obtained by first interreacting an aliphatic aldehyde, an aliphatic polyamine in which each amino group has at least one hydrogen atom, and an alkyl-substituted hydroxy aromatic compound; and then reacting the condensation product obtained by the foregoing procedure with an alcohol solution of a compound selected from the group consisting of metal oxides and metal hydroxyides.

3. An improved distillate fuel oil composition comprising a distillate fuel oil having admixed therewith a minor proportion of a reaction product obtained by first interreacting about one mol equivalent of an aliphatic aldehyde with at least one-half mol equivalent of an aliphatic polyamine in which each amino group has at least one hydrogen atom, and with a sufficiency of an alkyl-substituted hydroxy aromatic compound such that the content of the hydroxy aromatic radical is about one mol equivalent; and then reacting the condensation product obtained by the foregoing procedure with an alcohol solution of a compound selected from the group consisting of metal oxides and metal hydroxides, said alcohol solution containing an equivalent of metal to replace the hydroxyl hydrogen of the aforesaid condensation product.

4. An improved distillate fuel oil composition comprising a distillate fuel oil having admixed therewith a minor proportion of a reaction product obtained by first interreacting about one mol equivalent of formaldehyde with at least one-half mol equivalent of an aliphatic polyamine in which each amino group has at least one hydrogen atom, and with a sufficiency of an alkyl-substituted hydroxy aromatic compound such that the content of the hydroxy aromatic radical is about one mol equivalent; and then reacting the condensation product obtained by the foregoing procedure with an alcohol solution of a compound selected from the group consisting of metal oxides and metal hydroxides, said alcohol solution containing an equivalent of metal to replace the hydroxyl hydrogen of the aforesaid condensation product.

5. An improved distillate fuel oil composition comprising a distillate fuel oil having admixed therewith a minor proportion of a reaction product obtained by first interreacting about one mol equivalent of an aliphatic aldehyde with at least one-half mol equivalent of an aliphatic polyamine in which each amino group has at least one hydrogen atom, and with a sufficiency of an alkyl-substituted hydroxy aromatic compound such that the content of the hydroxy aromatic radical is about one mol equivalent; and then reacting the condensation product obtained by the foregoing procedure with an alcohol solution of a compound selected from the group consisting of alkaline-earth oxides and alkaline-earth hydroxides, said alcohol solution containing an equivalent of metal to replace the hydroxyl hydrogen of the aforesaid condensation product.

6. An improved distillate fuel oil composition comprising a distillate fuel oil having admixed therewith a minor proportion of a reaction product obtained by first interreacting about one mol equivalent of an aliphatic aldehyde with at least one-half mol equivalent of an aliphatic polyamine in which each amino group has at least one hydrogen atom, and with a sufficiency of an alkyl-substituted hydroxy aromatic compound such that the content of the hydroxy aromatic radical is about one mol equivalent; and then reacting the condensation product obtained by the foregoing procedure with an alcohol solution of a compound selected from the group consisting of barium oxide and barium hydroxide, said alcohol solution containing an equivalent of barium to replace the hydroxyl hydrogen of the aforesaid condensation product.

7. An improved distillate fuel oil composition comprising a distillate fuel oil having admixed therewith a minor proportion of a reaction product obtained by first interreacting about one mol equivalent of an aliphatic aldehyde with at least one-half mol equivalent of an aliphatic diamine in which each amino group has at least one hydrogen atom, and with a sufficiency of an alkyl-substituted hydroxy aromatic compound, such that the content of the hydroxy aromatic radical is about one mol equivalent; and then reacting the condensation product obtained by the foregoing procedure with an alcohol solution of a compound selected from the group consisting of metal oxides and metal hydroxides, said alcohol solution containing an equivalent of metal to replace the hydroxyl hydrogen of the aforesaid condensation product.

8. An improved distillate fuel oil composition comprising a distillate fuel oil having admixed therewith a minor proportion of a reaction product obtained by first interreacting about one mol equivalent of an aliphatic aldehyde with at least one-half mol equivalent of an aliphatic diamine having two primary amino groups attached to adjacent carbon atoms, and with a sufficiency of an alkyl-substituted hydroxy aromatic compound such that the content of the hydroxy aromatic radical is about one mol equivalent; and then reacting the condensation product obtained by the foregoing procedure with an alcohol solution of a compound selected from the group consisting of metal oxides and metal hydroxides, said alcohol solution containing an equivalent of metal to replace the hydroxyl hydrogen of the aforesaid condensation product.

9. An improved distillate fuel oil composition comprising a distillate fuel oil having admixed therewith a minor proportion of a reaction product obtained by first interreacting about one mol equivalent of an aliphatic aldehyde with at least one-half mol equivalent of an aliphatic diamine in which each of the two amino groups has at least one hydrogen atom and the amino groups are attached to adjacent carbon atoms, and with a sufficiency of an alkyl-substituted hydroxy aromatic compound such that the content of the hydroxy aromatic radical is about one mol equivalent; and then reacting the condensation product obtained by the foregoing procedure with an alcohol solution of a compound selected from the group consisting of metal oxides and metal hydroxides, said alcohol solution containing an equivalent of metal to replace the hydroxyl hydrogen of the aforesaid condensation product.

10. An improved distillate fuel oil composition comprising a distillate fuel oil having admixed therewith a minor proportion of a reaction product obtained by first interreacting about one mol equivalent of an aliphatic aldehyde with at least one-half mol equivalent of ethylene diamine and with a sufficiency of an alkyl-substituted hydroxy aromatic compound such that the content of the hydroxy aromatic radical is about one mol equivalent; and then reacting the condensation product obtained by the foregoing procedure with an alcohol solution of a compound selected from the group consisting of metal oxides and metal hydroxides, said alcohol solution containing an equivalent of metal to replace the hydroxyl hydrogen of the aforesaid condensation product.

11. An improved distillate fuel oil composition comprising a distillate fuel oil having admixed therewith a minor proportion of a reaction product obtained by first interreacting about one mol equivalent of an aliphatic aldehyde with at least one-half mol equivalent of an aliphatic polyamine in which each amino group has at least one hydrogen atom, and with a hydroxy aromatic compound substituted with at least one oil-solubilizing alkyl group having at least 20 carbon atoms, the said substituted hydroxy aromatic compound being present in an amount such that the content of the hydroxy aromatic radical in the reaction mixture is about one mol equivalent; and then reacting the condensation product obtained by the foregoing procedure with an alcohol solution of a compound selected from the group consisting of metal oxides and metal hydroxides, said alcohol solution containing an equivalent of metal to replace the hydroxyl hydrogen of the aforesaid condensation product.

12. An improved distillate fuel oil composition comprising a distillate fuel oil having admixed therewith a minor proportion of a reaction product obtained by first interreacting about one mol equivalent of an aliphatic aldehyde with at least one-half mol equivalent of an aliphatic polyamine in which each amino group has at least one hydrogen atom, and with a phenol substituted with a wax alkyl group, said phenol being present in an amount such that the content of said phenol in the reaction mixture is about one mol equivalent; and then reacting the condensation product obtanied by the foregoing procedure with an alcohol solution of a compound selected from the group consisting of metal oxides and metal hydroxides, said alcohol solution containing an equivalent of metal to replace the hydroxyl hydrogen of the aforesaid condensation product.

13. The method of stabilizing distillate fuel oils against the deleterious effects of oxidation which comprises incorporating therewith a small amount of a reaction product obtained by condensation of about one mol equivalent of an aliphatic aldehyde with at least one-half mol equivalent of an aliphatic polyamine in which each amino group has at least one hydrogen atom, and with a sufficiency of an alkyl-substituted hydroxy aromatic compound such that the content of the hydroxy aromatic radical in the reaction mixture is about one mol equivalent; and then reacting the condensation product obtained by the foregoing procedure with an alcohol solution of a compound selected from the group consisting of metal oxides and metal hydroxides, said alcohol solution containing an equivalent of metal to replace the hydroxyl hydrogen of the aforesaid condensation product.

EDWARD A. OBERRIGHT.
EDMUND L. SARGENT.

Certificate of Correction

Patent No. 2,353,192.      July 11, 1944.

EDMUND L. SARGENT ET AL.

It is hereby certified that errors appear in the printed specification of the above numbered patent requiring correction as follows: Page 2, first column, lines 55 to 60 inclusive, strike out the formula and insert instead the following—

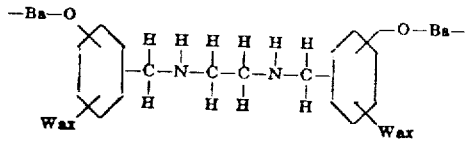

lines 63 to 68 inclusive, strike out the formula and insert instead the following—

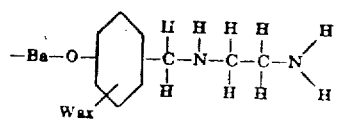

and that the said Letters Patent should be read with these corrections therein that the same may conform to the record of the case in the Patent Office.

Signed and sealed this 13th day of February, A. D. 1945.

[SEAL]

LESLIE FRAZER,
                    *Acting Commissioner of Patents.*